(12) United States Patent
Hill

(10) Patent No.: US 6,450,752 B1
(45) Date of Patent: Sep. 17, 2002

(54) METHOD AND APPARATUS FOR INCREMENTALLY FEEDING A TUBE ALONG A LINEAR TUBE PATH

(75) Inventor: Donald Hill, Glen Ellyn, IL (US)

(73) Assignee: Hill Engineering, Inc., Villa Park, IL (US)

( * ) Notice: Subject to any disclaimer, the term of this patent is extended or adjusted under 35 U.S.C. 154(b) by 0 days.

(21) Appl. No.: 09/337,282

(22) Filed: Jun. 22, 1999

(51) Int. Cl.[7] .................................................. B65G 1/10
(52) U.S. Cl. ..................... 414/330; 414/745.1; 414/786; 414/798.9; 198/429; 198/461; 226/108
(58) Field of Search ............................... 414/745.1, 786, 414/798.9, 330; 198/461, 429, 626.6, 502.2; 226/108, 174; 242/533.7; 156/494

(56) References Cited

U.S. PATENT DOCUMENTS

| | | | | | |
|---|---|---|---|---|---|
| 3,672,655 | A | * | 6/1972 | Carter | 226/108 |
| 4,124,156 | A | * | 11/1978 | Waffner | 226/25 |
| 4,228,939 | A | * | 10/1980 | Catteneo | 226/108 |
| 4,280,516 | A | * | 7/1981 | Reuland | 131/84 C |
| 4,364,466 | A | * | 12/1982 | Mojden | 198/459 |
| 4,679,685 | A | * | 7/1987 | Inoko | 198/461 |
| 5,161,663 | A | * | 11/1992 | Cupp et al. | 198/347.2 |
| 5,518,575 | A | * | 5/1996 | Wantanabe | 156/494 |
| 5,762,175 | A | * | 6/1998 | Focke et al. | 198/461.2 |
| 5,940,105 | A | * | 8/1999 | Hayami | 347/104 |

* cited by examiner

Primary Examiner—Joseph A. Fischetti
(74) Attorney, Agent, or Firm—Wood, Phillips, Katz, Clark & Mortimer

(57) ABSTRACT

A feeder system for incrementally feeding a tube along a linear tube path to a point of use. The feeder system includes a frame, and first and second belts on the frame. The first and second belts are capable of moving incrementally in respective first and second belt paths and thereby incrementally moving a tube engaged by the first and second belts in the linear tube path.

12 Claims, 4 Drawing Sheets

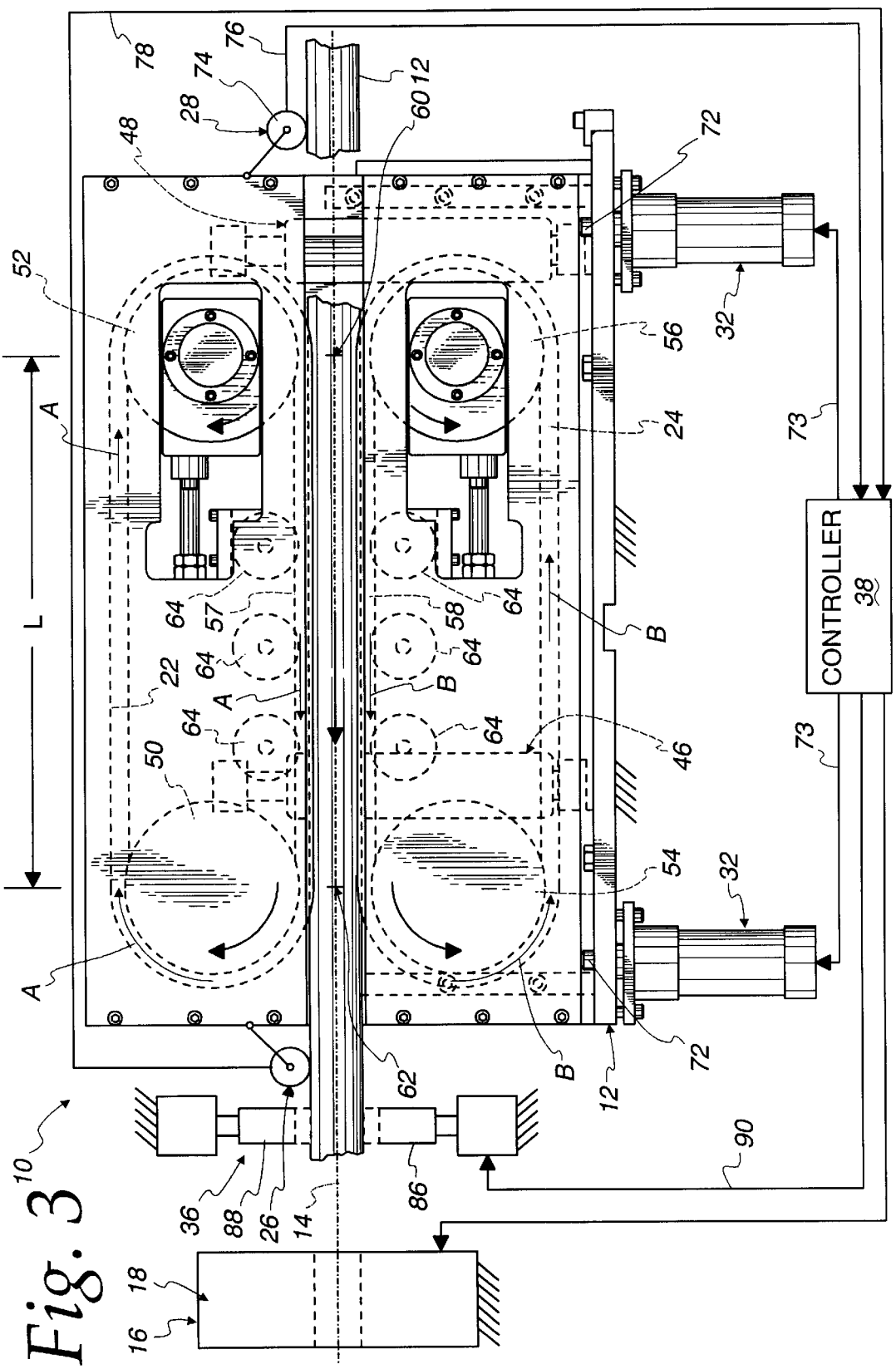

METHOD AND APPARATUS FOR INCREMENTALLY FEEDING A TUBE ALONG A LINEAR TUBE PATH

FIELD OF THE INVENTION

This invention relates to tube feeders, and more particularly, to an apparatus and method for incrementally feeding tubing along a linear path to a point of use, such as a tube cut-off.

BACKGROUND OF THE INVENTION

Tube feeders, such as pinch roll feeders, are well known for use in systems making a stationary cut-off of a length of tubing. Such stationary cut-off systems are used to cut a length of tubing into a number of tube pieces with lengths and accuracies that cannot be attained using "flying cut-off" systems in-line with a tube mill.

Commonly, the tube pieces are cut to a length that is controlled by a positive stop which engages the length of tubing to suspend the feeding action of the tube feeder while each tube piece is cut from the length of tubing. If tube pieces of different lengths are desired, the stationary cut-off system must be stopped and the positive stop repositioned to provide the new length.

It is also common for conventional feeders to feed one length of tubing at a time into the stationary tube cut-off. This can create a significant amount of scrap as the trailing end of a length of tubing may have to be discarded if it cannot be accurately fed into the stationary cut-off.

SUMMARY OF THE INVENTION

In accordance with the present invention, a feeder system is provided for incrementally feeding a tube along a linear tube path to a point of use. The feeder system includes a frame, and first and second belts on the frame. The first and second belts are capable of moving incrementally in respective first and second belt paths and thereby incrementally moving a tube engaged by the first and second belts in the linear tube path.

In one form, the feed system also includes an encoder that is capable of: a) engaging a tube moving in the tube path to measure each distance a tube engaged by the first and second belts moves with each incremental movement of the first and second belts, and b) producing signals indicative of each distance. The signals can be used to control the incremental movements of at least one of the first and second belts.

In one form, the feeder system further includes a servo drive capable of driving at least one of the first and second belts in incremental movements in the respective first and second belt paths, and a controller operably connected to a) the encoder to receive signals therefrom, and b) the servo drive to control the incremental movements of the at least one of the first and second belts by the servo drive in response to the signals received from the encoder.

In one form, there is a tube entry where a tube in the tube path engages the belts and a tube exit where a tube moved by the belts in the tube path disengages from the belts. The encoder is located adjacent the tube exit. A second encoder is provided adjacent the tube entry and is capable of engaging a tube moving in the tube path to measure each distance a tube engaged by the first and second belts moves with each incremental movement of the first and second belts. The second encoder is capable of producing second signals indicative of each distance and which can be used to control movements of at least one of the first and second belts.

In one embodiment, respective first and second portions of the first and second belt paths extend parallel to the linear tube path with the linear tube path extending between the first and second portions of the belt paths. The first portion is fixed relative to the linear tube path. The second portion is movable in a direction away from the linear tube path and the first portion.

In one form, the direction is a generally downward direction.

In one form, the second belt is mounted to the frame for translation of the second portion in the direction.

In one embodiment of the invention, respective first and second portions of the first and second belt paths extend parallel to the linear tube path, with the linear tube path extending between the first and second portions of the belt paths from a tube entry to a tube exit. The first and second belts are mounted to the frame for movement of the first and second belt portions relative to each other between a first position where a tube in a linear path is engaged by the first and second belts for incremental movement therewith, and a second position where a tube in the linear tube path is not engaged by the first and second belts for incremental movement therewith. The feeder system further includes a guide clamp located between the tube exit and the point of use. The clamp includes tube gripper plates movable between a first state wherein a tube in the linear tube path is not engaged by the gripper plates, and a second state wherein a tube in a linear tube path is a) held by the gripper plates with the first and second portions in the second position, and b) guided by the gripper plates along the linear tube path with the first and second portions in the first position.

In one form, the feeder system further includes a controller operably connected to a) at least one of the first and second belts to control movement of the first and second portions between the first and second positions, and b) the guide clamp to control movement of the gripper plates between the first and second states.

In one form, the feeder system further includes a sensor capable of detecting an end of a tube in the linear tube path and producing a signal to the controller indicative of the detected end. As a result of the signal to the controller, the gripper plate moves from the first state to the second state and the first and second portions move from the first position to the second position.

In one form, the feeder system further includes first and second encoders capable of engaging a tube moving in the tube path to measure each distance a tube engaged by the first and second belts moves with each incremental movement of the first and second belts. The encoders are capable of producing signals indicative of each distance, which signals can be used to control the incremental movement of at least one of the first and second belts. The first encoder is located adjacent the tube exit. The second encoder is located adjacent the tube entry.

In accordance with another aspect of the present invention, a method is provided for incrementally feeding a tube along a linear tube path to a point of use. In one form, the method includes the steps of engaging a tube in a linear tube path between first and second movable belts, moving at least one of the belts incrementally to move the tube incrementally along the tube path toward the point of use, measuring the distance the tube travels during the moving step, and controlling the incremental movements of the moving step based on the distance measured in the measuring step.

In one form, the moving step includes moving the first and second belts in respective first and second belt paths extending parallel to the tube path.

In one form, the method includes the steps of simultaneously engaging a leading tube and a trailing tube in a linear tube path between first and second belts, moving at least one of the first and second belts incrementally to move the leading and trailing tubes incrementally along the tube path towards a point of use, and after the leading tube has disengaged from the first and second belts, pushing the leading tube with the trailing tube as the trailing tube is incrementally moved along the tube path by the first and second belts.

In one form, the method further includes the step of guiding the leading tube in the tube path at a location between the point of use and the first and second belts as the leading tube is pushed by the trailing tube.

In one form, the method includes the steps of engaging a tube in a linear tube path between first and second lengths of belt moving incrementally in respective first and second belt paths, and maintaining the position of the first belt path relative to the linear tube path as the second belt path is moved away from the linear tube path and the first belt path.

BRIEF DESCRIPTION OF THE DRAWINGS

FIG. 3 is a side view of the tube feeding system taken generally along line 3—3 in FIG. 1.

DETAILED DESCRIPTION OF THE PREFERRED EMBODIMENT

Figure 1:
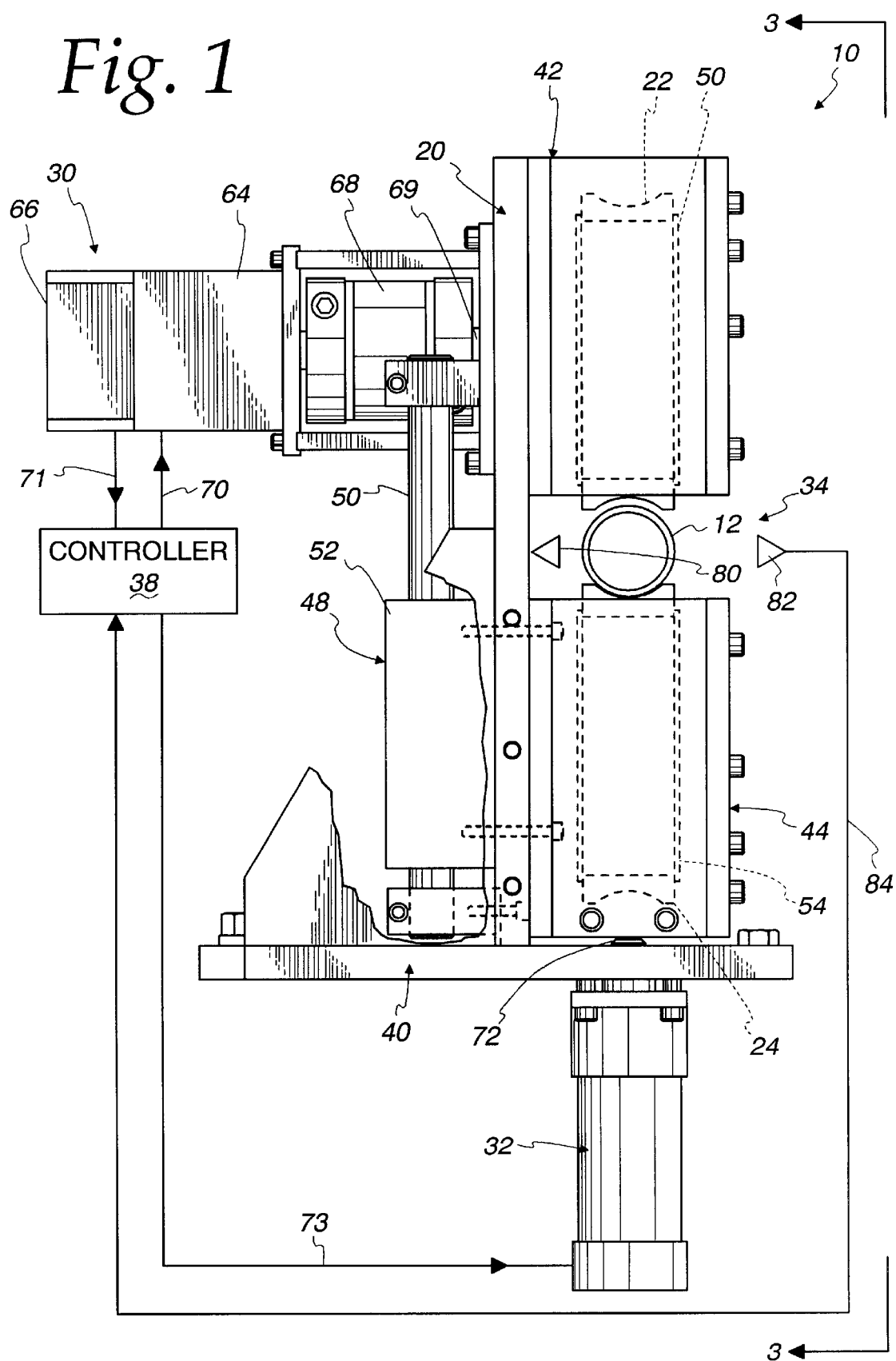
FIG. 1 is an end view of a feeder system embodying the present invention, with the feeder system in an open state and with portions of the system broken away to reveal selected components.

As shown in the drawings for purposes of illustration, the apparatus of the invention is embodied in a tube feeder system 10 for incrementally feeding a tube 12, or other elongate workpiece, along a linear tube path, shown schematically as dashed line 14, to a point of use 16, such as a stationary tube cutoff 18. The feeder system 10 includes a frame 20 with an upright plate 21, first and second belts 22 and 24, first and second encoders 26 and 28, a servo drive 30, a pair of linear actuators 32, a sensor 34 for sensing the end of a tube 12, a guide clamp 36, and a controller 38 operably connected to the first and second encoders 26 and 28, the servo drive 30, the linear actuators 32, the sensor 34, and the guide clamp 36 to control the incremental feeding of the tube 12 along the linear tube path 14 to the point of use 16 by the feeder system 10.

Figure 2:
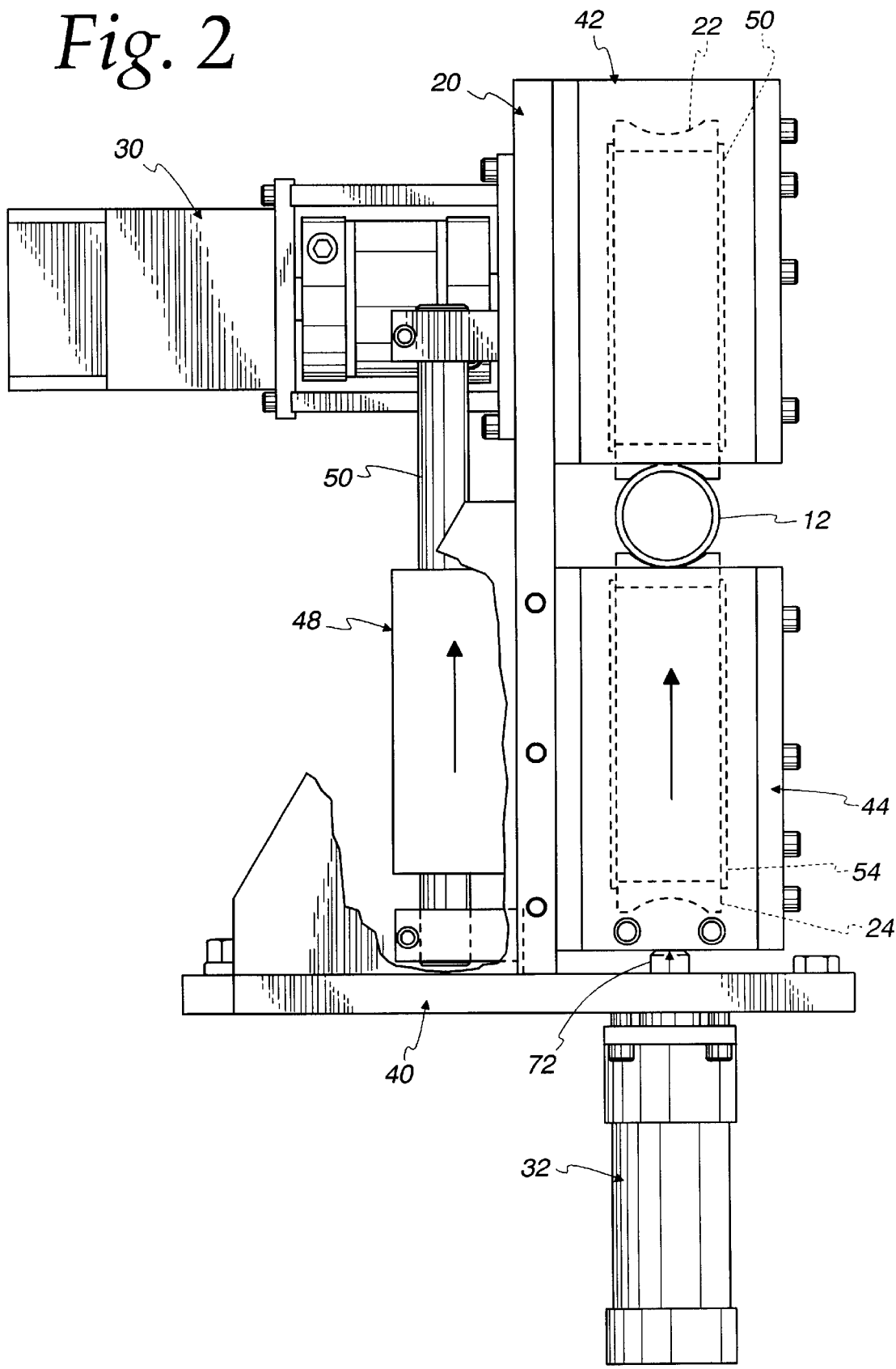
FIG. 2 is a view similar to FIG. 1, but showing the feeder system in a closed state.

The frame includes a base 40 fixed relative to the point of use 16, an upper belt support 42 fixed to the base 40, and a lower belt carriage 44 mounted to the base 40 by a pair of linear bearings 46 and 48 for linear movement between a first position shown in FIG. 1 and a second position shown in FIG. 2. While any type of linear bearing may be used for the bearings 46 and 48, it is preferred that the linear bearings 46 and 48 be linear ball bearings with each including a cylindrical pin 49 affixed to the upright plate 21 and a cylindrical ball sleeve 51 affixed to the lower belt carriage 44.

The first belt 22 is mounted to the upper belt support 42 for incremental movement along a first belt path, illustrated by arrows A in FIG. 3, by a pair of belt pulleys 52 and 53 that are each rotatably mounted to the upper belt support 42 by any suitable means, such as by a shaft (not shown) straddle mounted by ball bearings (not shown) positioned on opposite sides of the pulleys 52, 53.

The second belt 24 is mounted to the belt carriage 44 for incremental movement in a second belt path, illustrated by arrows B in FIG. 3, by a pair of pulleys 54 and 56 that are each rotatably mounted to the belt carriage 44 by any suitable means, such as by a shaft (not shown) straddle mounted by a pair of ball bearings (not shown) spaced on opposite sides of the pulleys 52, 53. The carriage 44 carries the second belt 24 between the first position shown in FIG. 1 and the second position shown in FIG. 2.

Preferably, the belts 22 and 24 are flat belts and the pulleys 52, 53, 54, 56 include annular flanges spaced on opposite sides of the belts 22, 24 to ensure that the belts 22, 24 ride true on the pulleys 52, 53, 54, 56. The surfaces of the belt 22, 24 that engage the tube 12 are flat but could be contoured to fit the cross-sectional shape of the tube. For a square tube, the belts 22 and 24 are preferably provided with a flat tube engaging surface.

As best seen in FIG. 3, respective first and second portions 57 and 58 of the first and second belt paths A and B extend parallel to the linear tube path 14 between a tube entry 60 where a tube 12 in the tube path 14 engages the belts 22 and 24, and a tube exit 62 where a tube 12 moved by the belts 22 and 24 in the tube path 14 disengages from the belts 22 and 24. Preferably, a plurality of idler pulleys 64 are mounted to the belt support 42 and the belt carriage 44 along the first and second portions 57 and 58 to ensure suitable engagement of the belts 22 and 24 with the tube 12 as the belts 22 and 24 move incrementally through the first and second portions 57 and 58 of the first and second belt paths A and B. Horizontally adjustable guide rollers 63, which are each pivotable about a vertical axis, may be provided in pairs at entry and exit locations.

While any suitable drive may be used to incrementally move the belts 22 and 24, as seen in FIG. 1 the servo drive 30 is preferably connected to at least one of the belts 22 and 24 to incrementally drive the belts along the respective belt paths A and B. The servo drive 30 includes a servo motor 64 coupled to a resolver 66. More specifically, the servo drive 30 is preferably connected to the pulley 52 by a shaft coupling 68 connected to a shaft 69 which is rotationally fixed to the pulley 52. The servo drive 30 incrementally rotates the pulley 52, thereby incrementally moving the belt 22 along its belt path A. When a tube 12 is engaged between the belts 22 and 24, the tube 12 and the belt 24 are moved incrementally by the friction forces between the tube 12 and the belts 22 and 24. The servo motor 64 is connected to the controller 38 by suitable control lines 70 and the resolver 66 is connected to the controller 38 by suitable signals lines 71.

While any form of linear actuator is acceptable, the linear actuators 32 are preferably provided in the form of pneumatic cylinders that are fixed to the base 40 with respective piston rods 72 that extend through the base 40 into engagement with the belt carriage 44 to drive the belt carriage 44, the belt 24, and the second portion 58 of the belt path B from the first position shown in FIG. 1 to the second position shown in FIG. 2. The linear actuators 32 are connected to the controller 38 by suitable control lines 73, which in the case of pneumatic cylinders would be provided in the form of air supply and return lines from and to a control valve (not shown) of the controller 38.

The encoders 26 and 28 are preferably rotary encoders, with each including a wheel 74 that engages the top of a tube 12 in the tube path 14 and is rotated by the tube 12 as the tube 12 moves incrementally in the tube path 14. Each of the encoders 26 and 28 generate an output in the form of a signal indicative of the amount of angular rotation of the wheel 74, which in turn is representative of the linear movement of the tube 12 along the tube path 14. The signal outputs of the encoders 26 and 28 are connected to the controller 38 by suitable signal lines 76 and 78.

Preferably, the sensor 34 is an optical sensor that includes an optical transmitter 80 located on one side of the tube path 14 and an optical receiver 82 located on the opposite side of the tube path 14. The sensor 34 is preferably located at the mid-point of the length L and is connected to the controller 38 by a suitable signal line 84.

The guide clamp 36 includes at least two gripper plates 86 and 88 that are movable between a first state (shown in phantom in FIG. 3) wherein a tube 12 in the linear tube path 14 is not engaged by the gripper plates 86 and 88, and a second state (shown in phantom in FIG. 3) wherein a tube 12 in the linear tube path 14 is: a) held by the gripper plates 86 and 88 with the first and second portions 57 and 58 of the belt paths A and B in the first position shown in FIG. 1, and b) guided by the gripper plates 86 and 88 along the linear tube path 14 with the first and second portions 57 and 58 in the second position shown in FIG. 2. In other words, the gripper plates 86 and 88 have a sufficient frictional engagement with the tube 12 to fix the tube against movement along the tube path 14 when the tube 12 is not engaged by the belts 22 and 24, but insufficient frictional engagement to prevent movement of the tube 12 along the tube path 14 when the tube 12 is driven by the belts 22 and 24. The gripper plates 86, 88 may be made from bronze with flat tube engagement surfaces. The gripper plates 86, 88 may be moved between the first and second states by pneumatic cylinders 89, or other types of linear actuation well known to those skilled in the art. The guide clamp 36 is connected to the controller 38 by suitable control lines 90.

The tube feeder system 10 has at least three modes of operation, a tube loading mode, a feeding mode, and a transition mode. In the tube loading mode, a tube 12 is placed between the first and second portions 57 and 58 of the belt paths A and B with the belt carriage 44 and the belt 24 in the first position shown in FIG. 1. The controller 38 then causes the actuators 32 to force the belt carriage 44 and the belt 24 from the first position shown in FIG. 1 to the second position shown in FIG. 2 to engage the tube 12 in the linear tube path 14 between the belts 22 and 24.

In the tube feeding mode, the controller 38 receives a command signal indicating the desired amount of incremental movement required for the current operation on the tube 12. In this regard, the command signal may be input by an operator, or preferably, input from an electronic data storage device where the command signal was previously stored as one of a sequence of command signals entered into the storage device by a user prior to initiation of the tube feeding mode. After receiving the command signal, the controller 38 causes the servo motor 64 to begin incremental movement of the belts 22 and 24 by driving the pulley 52. In this regard, the controller 38 receives a signal from the encoder 26 indicative of the distance the tube 12 is moved in the tube path 14 with each incremental movement of the belts 22 and 24. The controller 38 compares the signal from the encoder 26 with the command signal to control continued incremental movements by the servo motor 64, thereby accurately controlling the incremental movement of the belts 22 and 24, and the tube 14 in a closed loop fashion. This allows the feeder system 10 to accurately feed a tube 12 to a point of use 16 so that an operation can be performed at a precise location on the tube 12. In the illustrated embodiment, the feeding system can feed discrete lengths of the tube 12 to the cut-off 18 so that the tube 12 can be cut into a number of tube pieces, each having an accurate length. It should be understood that the controller 38 can be programmed to feed varying lengths of a tube 12 in sequence. For example, a single tube 12 having a length of 8 feet can be cut into four tube pieces, with the first tube piece having a length of one foot, the second tube piece having a length of 1.5 feet, the third tube piece having a length of 2.5 feet, and the fourth tube piece having a length of 2.75 feet. Thus, a single tube 12 can be cut into a "kit" of tube pieces with the pieces having the required lengths to form a particular structure, such as, for example, a bicycle frame.

Figure 4A:
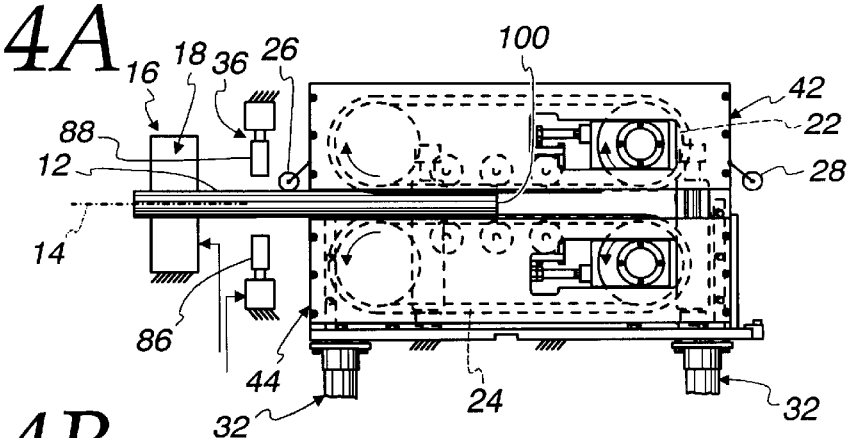
FIGS. 4A–D are views similar to that in FIG. 3 showing a sequence of operation for the tube feeding system.
Figure 4B:
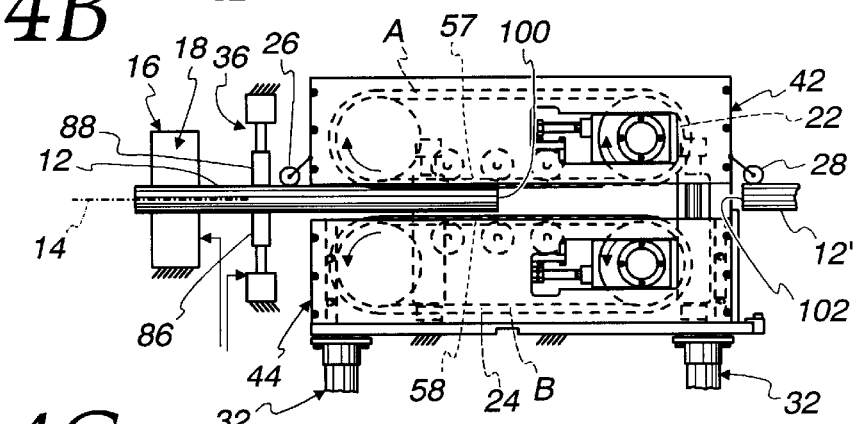
Figure 4C:
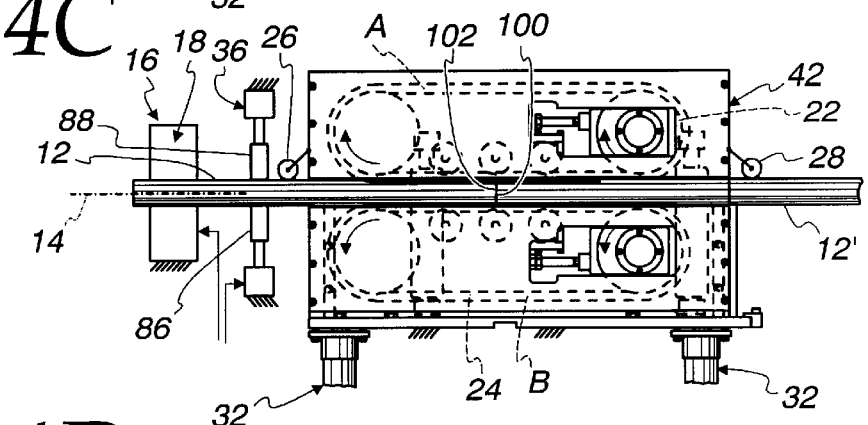
Figure 4D:
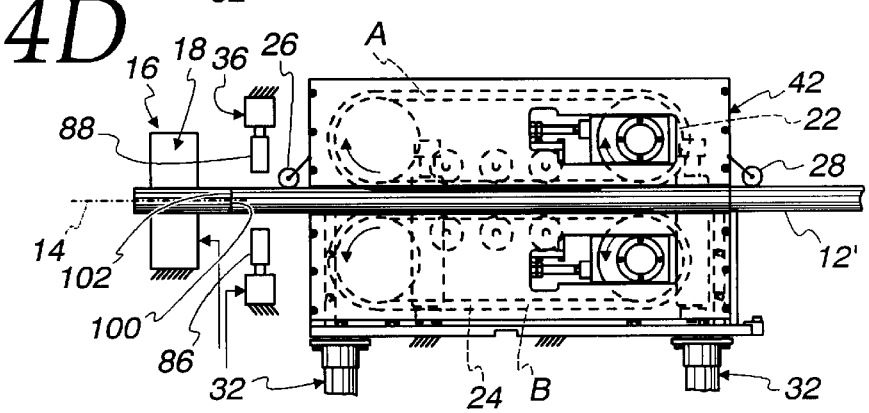

The feeder system 10 can enter the transition mode whenever the feeding system 10 is in the feed mode. With reference to FIG. 4A, the transition mode is initiated when the sensor 34 detects the trailing end 100 of the tube 12 (hereinafter the leading tube 12) and generates a signal to the controller 38 indicative of such detection. When the sensor 34 is provided in the form of the optical transmitter 80 and receiver 82, the trailing end of the leading tube 12 is detected when the receiver 82 detects light from the transmitter 80. After receiving the signal from the sensor 34, the controller 38 finishes the current commanded incremental movement of the tube 12 and then stops the servo drive 30 and causes the gripper plates 86 and 88 of the guide clamp 36 to move from the first state to the second state where the gripper plates 86 and 88 engage the tube 12, as seen in FIG. 4B. After the gripper plates 86 and 88 are moved to the second state, the controller 38 causes the second portion 58 of the belt path B to move away from the first portion 57 of the belt path A and the tube path 14. More specifically, the controller 38 causes the linear actuator 32 to lower the belt carriage 44 and the belt 24 from the second position shown in FIGS. 2 and 4A to the first position shown in FIGS. 1 and 4B. Preferably, when the linear actuators 32 are provided in the form of pneumatic cylinders, this movement is initiated by reducing the air pressure in the pneumatic cylinder to allow the carriage 44 and the belt 24 to be lowered along the linear bearings 46 and 48 by the force of gravity. With the second portion 58 in the first position shown in FIGS. 1 and 4B, a trailing tube 12' is placed between the first and second portions 57 and 58 of the belt paths A and B with the leading end 102 of the trailing tube 12' abutting the trailing end 100 of the leading tube 12 which is held against movement along the tube path 14 by the gripper plates 86 and 88 of the guide clamp 36. Next, the controller 38 causes the linear actuators 32 to move the second portion 57 from the first position shown in FIGS. 1 and 4B to the second position shown in FIGS. 2 and 4C by moving the carriage 44 and the second belt 24 upward along the linear bearings 46 and 48. The controller 38 then reinitiates the feeding mode, with the belts 22 and 24 incrementally moving both the leading tube 12 and the trailing tube 12' along the tube path 14 to the point of use 16. When the trailing end 100 of the leading tube 12 passes the tube exit 62, the leading tube 12 is no longer engaged by the belts 22 and 24, but is pushed by the trailing tube 12' along the tube path 14 as the trailing tube 12' is moved incrementally by the belts 22 and 24. The gripper plates 86 and 88 serve to guide the leading tube 12 along the tube path 14 to the point of use 16 because the leading tube 12 is no longer engaged and guided by the belts 22 and 24. While in the combined transition mode and feeding mode, the controller relies on a signal generated by the encoder 28 for closed loop control of the incremental feeding of the tubes 12 and 12' because the encoder 26 may generate an inaccurate signal when the trailing end 100 of the leading tube 12 and the leading end 102 of the trailing tube 12' pass beneath the encoder 26. After the trailing end 100 of the leading tube has been fed past the tube guide clamp 36, the controller 38 exits the transition mode by causing the gripper plates 86 and 88 to move from the second state to the first state where the gripper plates 86 and 88 are disengaged from the trailing tube 12', as shown in FIG. 4D. The trailing end 100 is tracked by the controller 38 to determine w hen the trailing end of the leading tube has passed through the guide clamp 36.

It should be understood that the invention is not limited to the disclosed preferred embodiments. For example, a feeder system 10 can be operated without a transition mode, in which case the tube guide clamp 36 would not be required. By way of further example, the servo drive 30 could be connected to directly drive any of the pulleys 52, 53, 54, and 56. As yet another example, while the belt paths A and B are shown as being generally oval in shape, other shapes for the belt paths A and B can be provided with the use of additional pulleys. As another example, while it is preferred that the belt path A remain fixed relative to the tube path 14, a feeding system 10 could be arranged such that the belt path B remains fixed relative to the tube path 14 with the belt path A moving away from the tube path 14 and the belt path B to allow loading of a tube in either the loading or the transition mode. In this regard, while it is preferred that the movement of either the belt paths A or B away from the tube path 14 be a translation, the movement can be provided by rotation or a combination of rotation and translation.

It should be appreciated that by providing feedback control of the incremental movement of a tube 12, the system 10 can accurately translate a tube 12 to the point of use 16, without the limitations imposed by using a conventional positive stop. Further, it should be appreciated that feeder system 10 allows for a single length of tubing 12 to be cut sequentially into a number of tube pieces of varying length in one continuous operation of the feeding system 10, without having to stop the feeding system 10 to reconfigure for each of the various lengths of cut. It should further be appreciated that by providing the transition mode, the feeding system 10 can accurately feed the trailing end of a length of tubing 12 to a point of use 16, thereby minimizing the amount of scrap produced by an operation.

What is claimed is:

1. A method of incrementally feeding an elongate tube having a length along a linear tube path to a point of use, the method comprising the steps of:

moving a first belt around first and second spaced pulleys in a first endless path so that a part of the first endless path is parallel to the linear tube path;

moving a second belt around third and fourth spaced pulleys in a second endless path so that a part of the second endless path is parallel to the linear tube path;

engaging the tube between the first and second belts so that the length of the tube is substantially parallel to the linear tube path and grippingly engaged between the first and second belts over a substantial length of the linear tube path;

moving at least one of the belts incrementally to move the tube incrementally along the tube path towards the point of use;

measuring a distance the tube travels during the moving step; and controlling the incremental movements of the moving step based on the distance measured in the measuring step, whereby the first and second belts positively and consistently advance the tube along the linear tube path as the at least one belt is incrementally moved.

2. The method of claim 1 wherein the moving step comprises moving the first and second belts in respective first and second belt paths extending parallel to the tube path.

3. The method of claim 1 wherein the step of measuring a distance the tube travels comprises engaging the tube moving in the tube path with a first encoder and producing signals indicative of a distance the tube moves.

4. The method of claim 3 wherein the step of moving at least one of the belts comprises using a servo drive to drive the at least one of the first and second belts and further comprising the step of using a controller operably connected to the first encoder and the servo drive to control incremental movement of the at least one of the belts.

5. The method of claim 4 further comprising the step of using a second encoder, engaging the second encoder with a tube engaged by the first and second belts to measure each distance a tube engaged by the second encoder moves with each incremental movement of the first and second belts, producing signals through the second encoder indicative of the distance a tube engaged by the second encoder moves with each incremental movement of the first and second belts, and using the second signals to control movement of at least one of the first and second belts.

6. The method of claim 1 wherein the step of moving at least one of the belts comprises using a servo drive to drive the at least one of the first and second belts.

7. A method of incrementally feeding elongate tubing with a length along a linear tube path to a point of use, the method comprising the steps of:

moving a first belt around first and second spaced pulleys in a first endless path so that a part of the first endless path is parallel to the linear tube path;

moving a second belt around third and fourth spaced pulleys in a second endless path so that a part of the second endless part is parallel to the linear tube path;

simultaneously engaging a leading tube and a trailing tube in the linear tube path between the first and second belts, with the length of the leading and trailing tubes substantially parallel to the linear tube path, the leading and trailing tubes being grippingly engaged by the first and second belts over a substantial length along the linear tube path;

moving at least one of the first and second parallel belts incrementally to move the leading and trailing tubes in controlled increments based upon the movement of the at least one of the first and second parallel belts along the tube path towards a point of use; and after the leading tube has disengaged from the first and second belts, pushing the leading tube with the trailing tube as the trailing tube is incrementally moved along the tube path by the first and second belts, whereby the first and second belts positively and consistently advance the tubes along the linear tube path as the at least one belt is incrementally moved.

8. The method of claim 7 further comprising the step of guiding the leading tube in the tube path at a location between the point of use and the first and second belts as the leading tube is pushed by the trailing tube.

9. A method of incrementally feeding a tube along a linear tube path to a point of use, the method comprising the steps of:

engaging a tube in a linear tube path between first and second movable belts;

moving at least one of the belts incrementally to move the tube incrementally along the tube path toward the point of use;

measuring a distance the tube travels during the moving step;

controlling the incremental movements of the moving step based on the distance measured in the measuring step, wherein the step of measuring a distance the tube travels comprises engaging the tube moving in the tube path with a first encoder and producing signals indicative of a distance the tube moves, wherein the step of moving at least one of the belts comprises using a servo drive to drive the at least one of the first and second belts and further comprising the step of using a controller operably connected to the first encoder and the servo drive to control incremental movement of the at least one of the belts, the method further comprising the steps of using:

a second encoder;

engaging the second encoder with a tube engaged by the first and second belts to measure each distance a tube engaged by the second encoder moves with each incremental movement of the first and second belts;

producing signals through the second encoder indicative of the distance a tube engaged by the second encoder moves with each incremental movement of the first and second belts; and using the second signals to control movement of at least one of the first and second belts, wherein there is a tube entry where a tube in the tube path engages the belts and a tube exit where a tube moved by the belts in the tube path disengages from the belts, and the first encoder is located adjacent the tube exit and the second encoder is located adjacent the tube entry.

10. The method of claim 2 further comprising the step of changing the first belt path.

11. The method of claim 1 further comprising the step of engaging the tube guidingly between gripper plates.

12. The method of claim 11 further comprising the step of moving the gripper plates away from each other so that the tube can be moved between the gripper plates without contacting the gripper plate.

\* \* \* \* \*